US008756960B2

(12) United States Patent       (10) Patent No.:     US 8,756,960 B2
     Poehlmann                  (45) Date of Patent:      Jun. 24, 2014

(54) BICYCLE HANDLEBAR-STORED CABLE LOCK

(76) Inventor: Christopher Harold Poehlmann, Annapolis, CA (US)

( * ) Notice: Subject to any disclaimer, the term of this patent is extended or adjusted under 35 U.S.C. 154(b) by 0 days.

(21) Appl. No.: 13/605,706

(22) Filed: Sep. 6, 2012

(65) Prior Publication Data

US 2013/0061642 A1    Mar. 14, 2013

Related U.S. Application Data

(60) Provisional application No. 61/531,618, filed on Sep. 7, 2011.

(51) Int. Cl.
    B62H 5/00     (2006.01)
    E05B 71/00    (2006.01)

(52) U.S. Cl.
    USPC ............ 70/30; 70/52; 70/53; 70/233; 70/386

(58) Field of Classification Search
    USPC ............. 70/30, 53, 233–235, 386, 49, 52, 18
    See application file for complete search history.

(56) References Cited

U.S. PATENT DOCUMENTS

| 1,472,206 | A | * | 10/1923 | Burkle | 70/30 |
| 1,991,825 | A | | 9/1933 | Strickland | |
| 2,623,378 | A | * | 12/1952 | Haver | 70/49 |
| 3,800,575 | A | * | 4/1974 | Perret, III | 70/233 |
| 4,023,387 | A | * | 5/1977 | Gould | 70/233 |
| 4,024,741 | A | * | 5/1977 | Arblaster | 70/233 |
| 4,064,714 | A | * | 12/1977 | Treslo | 70/18 |
| 4,186,576 | A | * | 2/1980 | Means et al. | 70/233 |
| 4,597,273 | A | * | 7/1986 | Reichenberger | 70/30 |
| 4,693,098 | A | * | 9/1987 | Davis et al. | 70/233 |
| 4,807,453 | A | * | 2/1989 | Bernier et al. | 70/233 |
| 4,845,967 | A | * | 7/1989 | Evans et al. | 70/233 |
| 4,870,843 | A | * | 10/1989 | Lundberg | 70/233 |
| 4,970,883 | A | * | 11/1990 | Johnson | 70/30 |
| 5,255,546 | A | * | 10/1993 | Saunders et al. | 70/233 |
| 5,289,704 | A | * | 3/1994 | Johnson | 70/30 |
| 5,513,508 | A | * | 5/1996 | Saunders et al. | 70/233 |
| 5,636,539 | A | * | 6/1997 | Tsai | 70/315 |
| 5,752,416 | A | * | 5/1998 | Nien | 74/551.8 |
| 6,505,846 | B1 | * | 1/2003 | Hoffman | 280/274 |
| 6,536,246 | B2 | * | 3/2003 | Wilson et al. | 70/233 |
| 6,595,031 | B2 | * | 7/2003 | Wilson et al. | 70/233 |
| 6,799,445 | B1 | * | 10/2004 | Tsai | 70/30 |
| 7,159,423 | B1 | * | 1/2007 | Mrdeza et al. | 70/59 |
| 7,870,764 | B2 | * | 1/2011 | Burmesch | 70/26 |
| 8,132,437 | B1 | * | 3/2012 | Chen | 70/233 |
| 2002/0104337 | A1 | * | 8/2002 | Kuo | 70/30 |

* cited by examiner

Primary Examiner — Lloyd Gall
(74) Attorney, Agent, or Firm — Kolisch Hartwell, P.C.

(57) ABSTRACT

An improved cable lock device incorporating a lock housing incorporating both a cylindrical combination lock and axial friction fingers and associated with a flexible shackle that stores entirely inside handlebars of vehicles that utilize handlebars. The shackle is secured at one end to the lock housing and the other end to a toothed key to be inserted into the anterior end of the combination lock to form a locked loop for securing the vehicle. In the stored configuration of the device in the handlebar the toothed key is retained at the posterior of the lock housing. At its midpoint the shackle is bent substantially 180 degrees and attached to a small ball that will fit inside the handlebars. Resilient rings of fingers are attached on the axis of the lock housing. Upon lock insertion the resilient fingers deform to interior bore of the handlebar for friction locking.

16 Claims, 3 Drawing Sheets

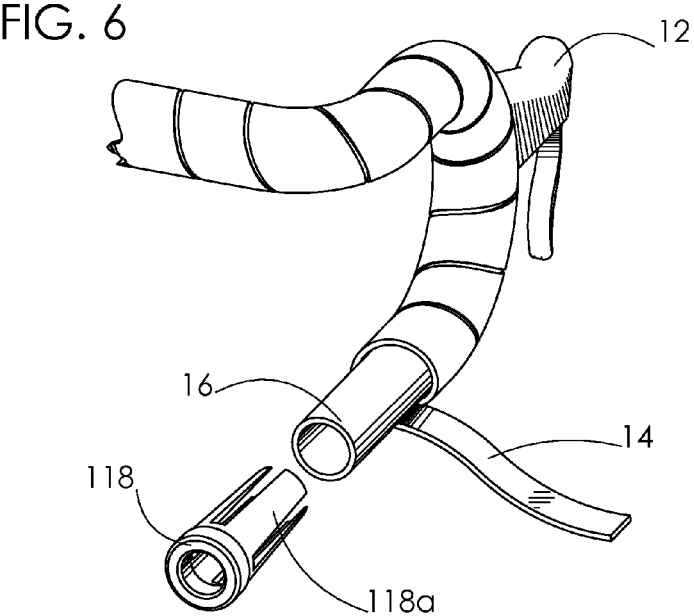
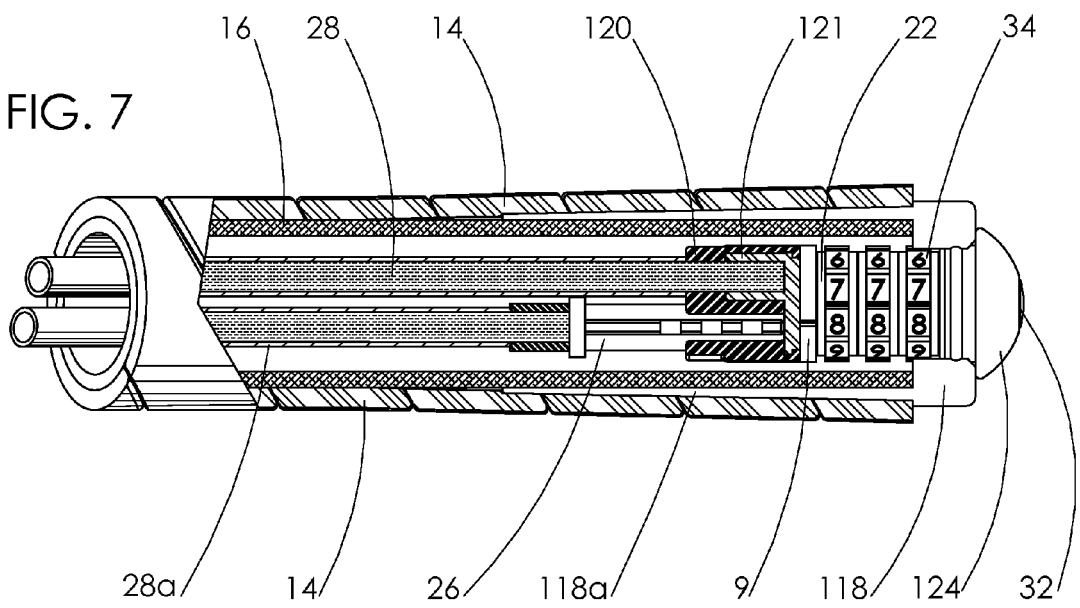

BICYCLE HANDLEBAR-STORED CABLE LOCK

CROSS-REFERENCE TO RELATED APPLICATION

This application claims the benefit of provisional patent application Ser. No. 61/531,618, filed Sep. 7, 2011 by the present inventor.

FIELD OF INVENTION

This invention relates to security devices, specifically to portable cable locks meant to secure from theft articles such as bicycles, vehicles and devices employing tubular handlebars and tubular elements, and the accessories of said articles.

BACKGROUND ART

Previously, bicycle cable locks when not in use have primarily been stored in either a cargo bag or device attached to the bicycle, coiled around the tubes comprising the frame, or on the body of the rider. This makes use (retrieving, uncoiling, locking, and subsequent stowing of the lock after use) time consuming and difficult. External storage of the lock can also cause chipping of the bike's paint finish. External storage of the coiled or uncoiled cable lock is also aesthetically undesirable for appreciating the overall design of the bicycle. External storage is also unfavorable aerodynamically and weight wise for those riders concerned with optimum equipment performance, one major aim of this invention.

Thereafter inventors created several lock designs that addressed ways to conceal the lock and cable attached thereto. U.S. Pat. No. 4,024,741 shows a solution to the concealment and stowing need, employing the internal bore of the handle bars as the storage area; however this lock is: prohibitively heavy, involves permanently installing lock components to the handle bars, and requires a complicated multi-stage process to deploy and use involving unattached parts. Further, it features a short maximum cable length, an inability to detach the lock completely from the bike to allow for minimum bicycle weight and other security uses, and substantially adds to the length of one of the distal ends of the handlebar—a safety concern due to interference with the riders knees during peddling. Additionally the complicated design of the locking mechanism would be expensive to manufacture and adds unnecessary weight and difficulty in its permanent installation needs.

Additionally U.S. Pat. No. 4,597,273 proposes a simpler design that is primarily aimed at securing ski poles by using the tubular bore of the pole for a storage location. Its application would not be applicable in its proposed design due to the exposed metal components that would allow for paint damage to expensive bicycle frame members along with potential for injury to the rider. Its design is also unable to comply with the need of secure affixement in the handle bar during the vibration caused by riding. Additionally, the long loop created by the crimped and folded end of the non-locking end of the cable would not successfully navigate the multiple curves of the interior bore of road bicycle handlebars during insertion and retrieval.

U.S. Pat. No. 4,693,098 allows for insertion and retrieval of the cable into multiple curved handlebars but requires the use of a clamp-on, heavy, keyed lock that is shown attached to the outside of a bicycle frame tube member. This defeats the need for aerodynamic and aesthetic invisibility. No provisions have been included to keep the cable from moving out of the handlebar due to vibration during bicycle use.

A lightweight combination lock and concealed storage in the tubular interior of vehicle handlebars is featured in U.S. Pat. No. 4,870,843. However, in the design additional weight is added by making the design a self retracting one utilizing linked chain and having the chain retract for storage in two parts utilizing both open ends of the handlebar. This design is prone to failure due to its use of springs and additionally introduces safety concerns due to the exposed combination lock and its mating toothed lock pin exposed during bicycle use. This configuration of the design exposes the rider's body to sharp metal surfaces and makes that eventuality more likely as it adds to the effective length of the handlebar toward the rider. This design additionally requires permanent installation, difficulty in retrieval of failed components, the inability to remove the lock entirely for maximum bicycle lightness, and the inability to remove and employ the lock for securing accessories or other bike components away from the immediate area of the handlebar. Noise and rattling would probably be a detraction during use in the lock's storage mode as the chain and retraction springs would interact with the interior bore of the handlebar.

In U.S. Pat. No. 4,186,576 the safety problem regarding rider's knees of the previously addressed designs is solved but weight continues to be a design problem due to the use of a keyed lock utilized and its need for large metal components. The lock is cumbersome to use due to the need to unlock and retract a lock body, flip of one of the cables from rear to front orientation, remove one cable ball end, carefully replace the ball end after wrapping the cable about the item to be secured, and reinsert the lock and lock with a key. The design necessitates a manufacturer's alteration of the handlebar end to have a close tolerance hole drilled into the dorsal side of the aluminum or carbon fiber handlebar near one end opening. This is an operation that few bicycle owners would be prone to do themselves or have done. Having handle bar tape on the bars would prevent visual inspection of the locked or not locked nature of the locking pin positioning. The user is also tasked with finding the location of the hole to align with the locking pin to allow insertion and securing by key turning. The design also presupposes that one size lock body fits all handlebar interior bores, which is decidedly not the case. No aspect of the design allows for adaptation of the lock body to varying interior bores of existing handlebars. A close tolerance fit is essential for the reliable operation of this lock U.S. Pat. No. 4,970,883 addresses some of the drawbacks of the aforementioned prior art but introduces its own distinct disadvantaging features. A more compact design is proposed utilizing a combination lock with a flexible shackle cable and a depressing button release to free the cable end from the lock body. This design again needs to be constructed with substantial amounts of metal making it heavy for weight conscious riders and requiring portions of it to be permanently attached to the handlebar. In this design the inventor suggests that a needed sleeve mounted permanently inside of the handlebar for lock storage should be attached with adhesive. The inventor does not account for the many different interior diameters found in the range of handlebars available and the need to supply the needed close tolerance fit for the aforementioned sleeve.

The depressing button needed to release the cable end is shown protruding out of the end of the end of the handle bar, raising the aforementioned safety concerns for the rider. Spring loaded detent balls engaging into annular grooves in the interior bore of the sleeve are proposed to secure the lock housing. The ball idea, magnets, spring fingers or thread solutions additionally offered as securing options would all pose problems in the available space available in the interior bore of most handlebars. These complicated mechanical solutions for securing the lock housing introduces the likelihood for common failure due to the miniaturization needed, the relatively high amounts of contaminates exposed to outdoor equipment, and the tolerances needed between the sleeve and the lock housing. The proposed design again exposes the rider to injury due to the metal protuberances and the considerable additional effective length of one end of the handlebar facing the rider.

Undesired weight is added from the design's additional components to the traditional two piece combination lock design featuring a toothed pin mating axially into a lock body with spinning numbered lock rings, see U.S. Pat. No. 1,472,206. Additional lock parts are needed to interact with the pawl mechanism associated with the cable end caps. Contamination commonly found in outdoor environments is sure to hinder reliability of this device due to the many additional moving parts and reliance on small spring components.

The shown length needed in U.S. Pat. No. 4,970,883 for the entire sleeve-lock body-cable caps configuration would not fit into the approximately 2 inches of length available in the straight distal section of most road, or "rams horn" shaped bicycle handlebar ends. After this straight approximate two inches, the interior bore bends acutely upwards and prevents insertion of rigid straight objects.

A similar invention idea was proposed with U.S. Pat. No. 5,289,704 using a combination lock that controls the release of a latch body on a free end of a flexible shackle and inserted in one end of a tube, typically a bicycle frame member or ski pole. This effort suffers from the same weight gains as U.S. Pat. No. 4,970,883 as it requires additional locking components than a common cylinder combination lock and additionally features a screw operated mechanical securing feature.

The distal end of the lock features a large round knob that must be turned to secure or release the lock from the interior bore of the tube. The twisting either expands a rubber plug that engages the interior bore and locks the lock in place or releases the squeezing on the plug which contracts and assumes a smaller diameter and releases, and allowing the lock to be pulled out of the bore of the tube. This time consuming, mechanical solution requires additional components such as the screw, a mating threaded nut, a sufficiently large knob to turn, and a large dense rubber plug. The more moving parts of this design with its springs, plunge pins, screws, friction surfaces, rubber components and small in size locking surfaces all add up to more reliability and maintenance problems which add up to reduced security, all undesirable for a locking security device.

This invention solves all the above problems of prior art by completely storing the entire cable lock within the unused interior bore of the bicycle's handlebar while allowing for lightweight, simple design, low cost and ease and speed of use plus additional advantages. Its features allow for easy retrieval, use, and stowing with no additional aerodynamic drag added to the bike. The invention does not introduce any sources of potential injury to the rider. Its completely disappearing storage mode enables the bicycle owner to have a visually unencumbered machine and the ability to carry a discreet security device to protect from theft. The lock adapts to any of the common interior bore sizes of handlebars. It does not compromise the structure of any bicycle component as no portion of it is permanently attached to the bicycle. The deployed lock can also be used for any number of security applications beyond use with a bicycle. These could include helmets, gloves, packs, clothing, etc.

DISCLOSURE OF INVENTION

Accordingly, several objects and advantages of the invention are as follows:
(a) to provide a lock that is lightweight for use with light bicycles.
(b) to provide a lock that stores within the existing handlebar of a bike that is discreet and does not add any aerodynamic drag.
(c) to provide a lock that simply adapts to all common handlebar interior bores without modification of said bores.
(d) to provide a lock that is simple to use and does not require any more than a simple pull to deploy the lock.
(e) to provide a lock that has few moving parts and is simple to produce and maintain.
(f) to provide a lock that can be removed away from the bike to secure other articles.
(g) to provide a lock that in use does not mar or damage the article it is securing.
(h) to provide a lock that does not add any rider safety issues over commonly found bicycle components and accessories.

According to the present invention, an improved cable lock which can be used to lock a vehicle such as a bicycle and can be stored within the bike handle, the lock housing is cylindrical in shape and elongated on its axis including a locking means comprising a dial type combination lock having a plurality of rotating tumblers and a cable having one end secured near the posterior of the locking housing and the second end having a toothed pin either removably attachable through a small opening in the anterior of the locking housing into the combination lock to lock the bike to an object or removably held in a rubber toothed pin holder in the posterior of the locking housing when the cable and the lock housing are stored in the bicycle handle bar. To hold the cable lock in place in the handlebar, rings are located at both ends of the lock housing having radially outwardly extending resilient friction fingers that contort to conform to the interior bore of the handlebar. To reduce the length of the cable when inserted into the vehicle or bicycle handlebar and better facilitate the insertion, the cable is bent substantially 180 degrees at its midpoint where a small ball is attached to the cable.

While the present invention has been described above with many specificities, these should not be construed as limiting the scope of the invention but as merely providing illustrations of some of the presently preferred embodiments of this invention. It is to be understood that the invention is not limited to the disclosed embodiments. On the contrary, the present invention is intended to cover various modifications and equivalent structures included with the spirit and scope of the appended claims. Thus the scope of the invention should be determined by the appended claims and their legal equivalents, rather than the examples given.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 6 is a perspective view of a portion of the handlebar with the handlebar tape removed to allow attachment of a rubber bar end cap.

FIG. 7 is an elevation section view of the end portions of the cable lock in an alternate embodiment inside a bicycle handlebar.

DETAILED DESCRIPTION OF THE INVENTION

Figure 1:
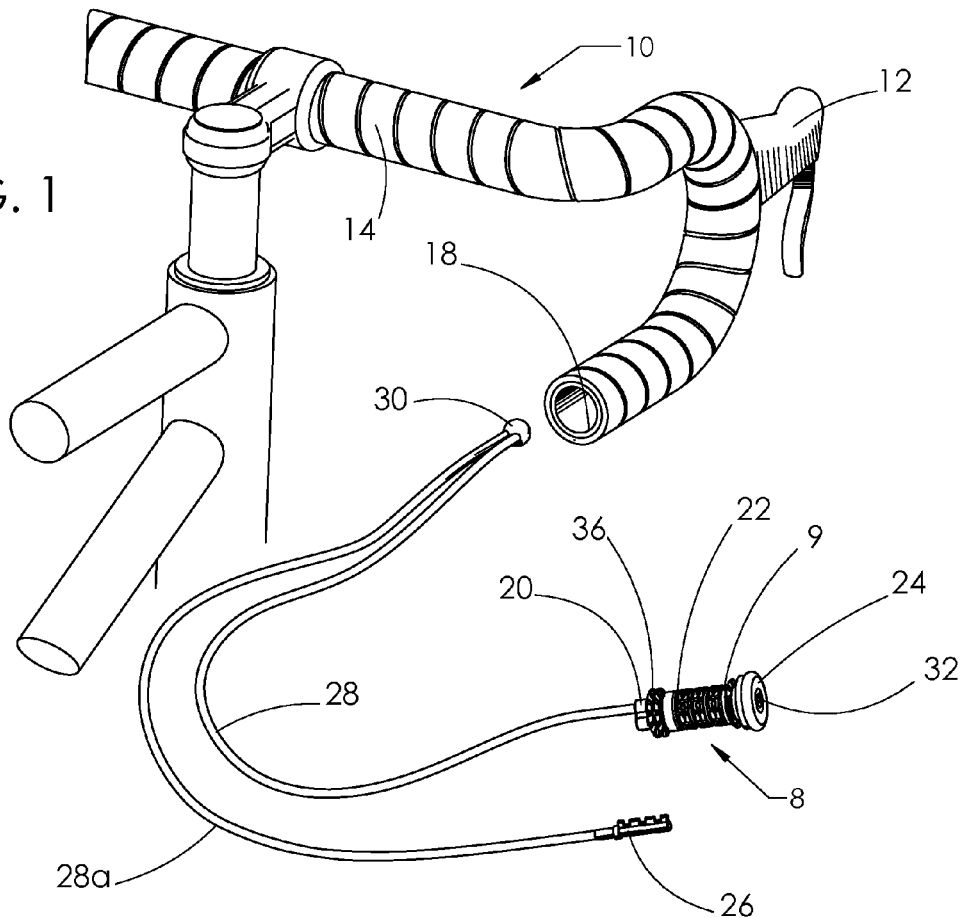
FIG. 1 is a perspective view of the bicycle handlebar-stored cable lock ready for insertion into a bicycle handlebar.

The invention relates of a cable lock and its storage in a bicycle handlebar with no modifications of said handlebar. FIG. 1 is a perspective view of the basic version of the handlebar stowing cable lock and the bicycle tape wrapped handlebar 10 with the exposed end of the handlebar opening 18 the cable lock will be inserted into. FIG. 1 shows lock assembly 8 in a removed position (e.g., FIG. 1 shows lock assembly 8 completely removed from a bore of handlebar 10). The lock assembly 8 is formed from a lock body 9 and a folded cable or shackle compromising separate portions 28, 28a. A toothed pin 26 is crimped onto the end of one of the plastic coated metal cable portion 28a. The toothed pin 26 is shown not yet inserted into the rubber toothed pin holder 20 in preparation for storing the lock within the tape wrapped handlebar 10. The end of the other plastic coated cable portion 28 is mechanically crimped inside an integrated crimping ferrule 21 affixed onto the posterior of the lock body 9. The rubber toothed pin holder 20 both encapsulates the cable end and crimping ferrule 21 along with providing a shaped chamber to accept and hold the toothed pin 26 during the storage configuration of the lock. The rubber toothed pin holder 20 is shown attached to the rear of the three-tumbler combination lock 22. Because the lock is intended to be stored in the narrow bore of a handlebar, the mid-point of the cable is fastened in a plastic ball end 30 with both cable halves exiting the same side of the ball in close proximity and parallel. The two cable portions 28 and 28a are thus held in narrow profile to easily slip into the handlebar. The cable is bent 180° back on itself to form a bend roughly at its midpoint with the small plastic ball end 30 secured at the bend. In other words, a first portion of the cable extends into ball end 30 where the cable forms a 180° bend from which a second portion of the cable extends out of ball end 30, as shown in FIG. 1. This ball is inserted first and allows for the easy travel of the doubled cable past the interior bends and any obstructions in the interior of the handlebar. The toothed pin holder 20 is secured to the posterior of the lock body 9 and removably secures the toothed pin while the lock assembly is stored within the handlebar. The pin holder 20 and the lock body 9 with its rubber rings of friction fingers 36 follows the ball and doubled cable into the bar opening and is inserted until it is entirely within the interior of the bar and the back side of the rubber bar end cap 24 is in contact with and sealing the handlebar opening 18.

The rigidity of the cable portions 28 and 28a and ball 30 allow for the user to insert the lock in short strokes until the entire length of the cables are within the handle bar bore and successfully navigated past the bends in the bar. The strong yet flexible plastic covered metal cable 28 and 28a is adequate enough to afford security against theft for the owner of an expensive bicycle and to allow for an occasional short absence away from the bike during a ride. Situations where there is needed security for overnight, long term, or within an area of high theft risk, the bicycle owner will employ appropriately more robust locks not made for carrying on rides where performance and aesthetics are an issue.

Figure 2:
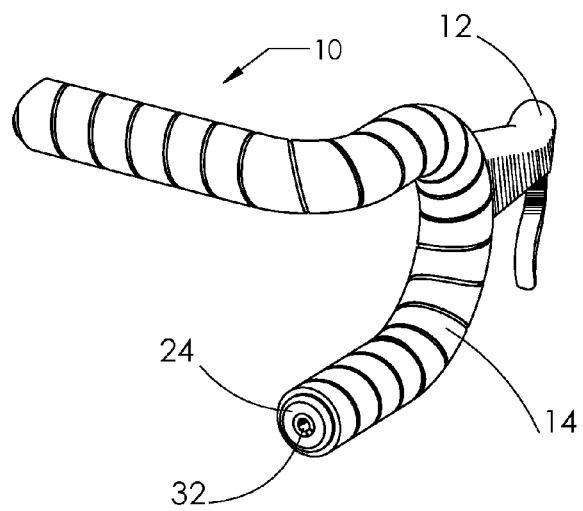
FIG. 2 is a perspective view of the cable lock inserted into a bicycle handlebar.

The stored configuration of the lock is seen in FIG. 2 in a perspective view of the lock end cap 24 in position at the handlebar opening 18. In this view the toothed pin 26 has been inserted into the toothed pin holder 20 and the ball end 30 with the two cable halves has been inserted into the end of the handlebar opening 18. The ball end 30 with its smooth surfaces allows easy navigation of the shackle past the bends in the handlebar. One such bend is adjacent to the handbrake 12 attachment point on the outside of the handlebar. The shackle is guided into the bar until the entire length of the lock assembly 8 is within the bar and only the lock end cap 24 is seen. The handlebar tape 14 is shown wound around the outside surface of the handlebar and has its final winding at the end of the handlebar capped and protected by the lock cap end 24 when it is in place in the handlebar opening 18. This is also shown in the cross section of FIG. 5. In this stored position only the lock end cap 24 with its axial positioned toothed pin hole 32 is exposed.

The lock's existence in place is only revealed by the small toothed pin hole 32 in the rubber lock end cap 24 made to accept the insertion of the lock's toothed pin 26. Other than this hole, the cap is the same shape, size, and usual material as a standard handlebar end cap. Thus concealed, it protects from its theft and aesthetically does not detract from standard aerodynamic and compact bicycle components. The end cap's rubber material is soft and non-marring to the bicycle when in use and safely protects the rider's body from injurious contact with the handlebar ends. The lock design allows the complete removal of all components of the lock and the selective use of a standard bar end plug to seal the end of the handlebar 18. This option allows the rider to have the lightest weight bicycle as possible for maximum performance and for rides where the rider does not anticipate the need to lock the bike for security.

Figure 3:
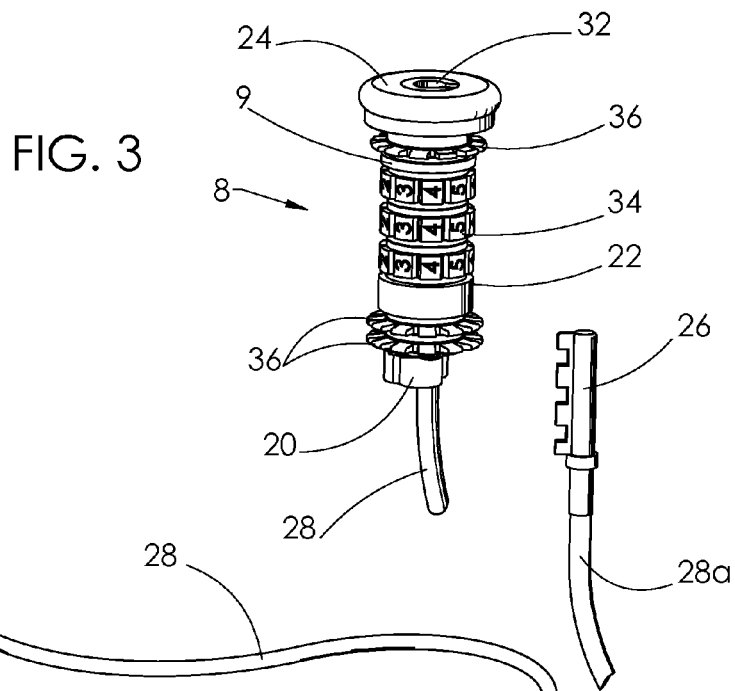
FIG. 3 is a perspective view of the ends of the cable lock.

The lock assembly 8 and toothed pin 26 are best seen in FIG. 3 in a perspective view of the entire lock assembly with lock mechanism. The preferred mechanism is a combination-style lock having a plurality of individual tumblers 34. The toothed pin 26 is a well-known lock element found in cylindrical combination locks. This pin has a plurality of spaced apart teeth arranged in a line parallel to the axis of the pin. Each numbered tumbler is rotatable on a hollow shaft that terminates on its anterior end in the toothed pin hole. The shaft is a slotted cylinder with the slot the approximate width of the width of the teeth on the toothed pin 26. The shaft accepts the toothed pin 26 and allows the projection of each of the teeth through the slot and beyond the outside diameter of the shaft. In a conventional manner, each of the tumblers 34 rotating on the shaft allows axial movement of its respective tooth only when in one relative position of rotation with respect to the shaft. As shown in FIG. 3, plurality of rotating tumblers 34 are serially disposed along an elongate axis of combination lock 22. The lock can be shifted selectively between locked and open configurations. Otherwise the lock remains in a locked configuration with the toothed pin 26 locked within the lock body 9. With the toothed pin 26 inserted into the lock end cap 24 and locked into the shaft on the anterior end of the lock assembly 8 and the other cable end attached to the posterior end of the lock assembly 8, a circular shackle loop is created to secure the bicycle or an accessory.

Figure 5:
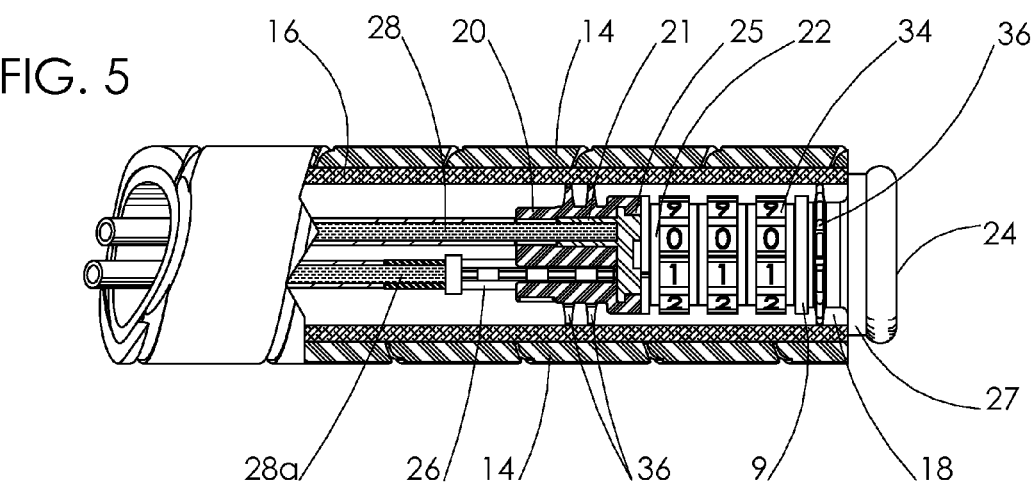
FIG. 5 is an elevation sectional view of the end portions of the cable lock inside a bicycle handlebar.

The rings of resilient friction fingers 36 are axially arranged on the lock body 9, The fingers are the preferred means to provide friction to secure the lock body within the handlebar after insertion. Alternately, these could be formed, for example, of neoprene rubber, soft polyurethane, or spring metal. In this embodiment three rubber rings are employed. A single anterior ring of friction fingers 36 is positioned just to the rear of the lock end cap 24. As shown in FIG. 3, plurality of tumblers 34 are disposed between a first set or plurality of fingers 36 and a second set or plurality of fingers 36 (e.g., fingers 36 disposed between tumblers 34 and an upper portion of end cap 24 in FIG. 3 may be described as the first set of fingers 36, and fingers 36 disposed between tumblers 34 and a lower portion of pin holder 20 in FIG. 3 may be described as the second set of fingers 36). It is an integral part of a molded piece that also incorporates the lock end cap 24. The fingers are radially arranged to the axis of the lock and present flat resilient surfaces that contort to conform to the interior bore of the handlebar 10. Each individual finger 36 is able to bend in both directions of the line of axis of the lock assembly 8. In the stored configuration the fingers 36 on all of the rings will be bent over in the direction of the lock end cap 24 and the anterior of the lock. As shown in FIG. 5, the direction from fingers 36 toward lock end cap 24 may be described as a direction from fingers 36 toward opening 18, as end cap 24 is shown disposed in opening 18. Upon the grasping of the lock end cap and the beginning of the extraction of the lock assembly 8 from the handlebar bore, the fingers 36 will contort and simultaneously flip to the axially opposite position then pointing to the posterior of the lock assembly 8 until they are released from the lock bore and assume a neutral, unbent position. As shown in FIG. 5, a direction pointing from fingers 36 toward the posterior of lock assembly 8 may be described as a direction from fingers 36 away from opening 18, as the posterior of lock assembly 8 is shown disposed opposite opening 18 relative to fingers 36. No other motions other than pushing or pulling are needed to respectively insert or retract the lock assembly 8 from the handlebar 10. Rings of fingers 36 may be dimensioned to adapt to inside diameters of all commonly available handlebars to provide securing friction. Other materials and configurations for the detent function performed by these axially arranged rows of fingers 36 are possible in alternate embodiments. The novel feature of rings of rubber friction fingers 36 not only allows use of the lock with most interior handlebar diameters but also adds the least amount of weight to accomplish this feat. The rings of bent friction fingers 36 secure the lock within the handlebar, prevent the backward motion of the lock and its falling out, and also prevent vibration and noise generated from contact to the hard materials of the bars. The close spacing of the resilient rings of friction fingers 36 on adjacent sides of the combination lock tumblers 34 helps in keeping the metal rotating tumblers from contacting and marring bicycle surfaces during its employment in the lock configuration.

Figure 4:
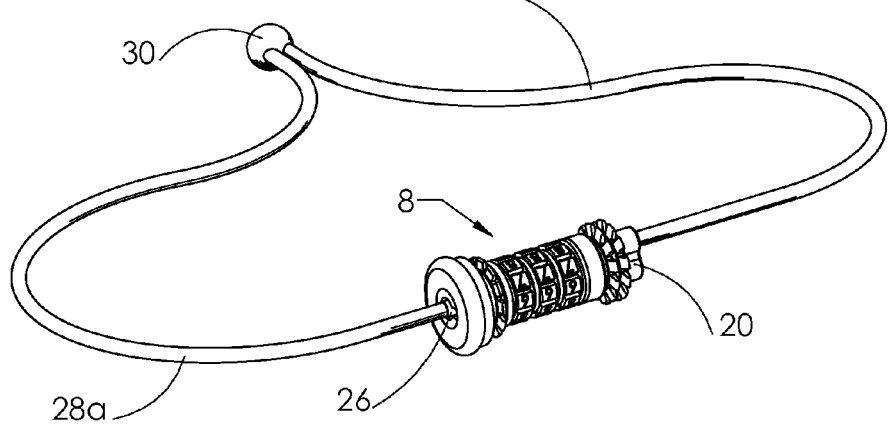
FIG. 4 is a perspective view of the cable lock in connected position.

FIG. 4 is a perspective view of the cable lock assembly 8 in the locked mode and as it would be in use, forming a loop of cable allowing the locking of the bicycle to a secure object or to itself to prevent movement. FIG. 4 shows lock assembly 8 in the removed position. The toothed pin 26 has been pulled out of its storage position, inserted in the rubber toothed pin holder 20 attached to the rear of the three-tumbler combination lock 22 and is shown in the locked configuration inserted into the toothed pin hole 32 in the face of the lock end cap 24. The insertion of the toothed pin 26 into the rubber bar end cap 24 for the locking position and use is advantageous as it maximizes the length and circular shape of the deployed cable versus previous designs that have both ends of the cable attached to and emerging from the same end of the lock housing 9 in the locked configuration.

FIG. 5 is a cross section view of the tape wrapped handlebar 10 end with the lock assembly 8 in its stowed position inserted into the handlebar opening 18. A rear resilient flange 27 behind the anterior annular knob of the end cap 24 provides a seal against the handlebar opening 18 and handlebar tape 14 to protect the lock from moisture and dust. The rubber toothed pin holder 20 is attached to the rear of the lock body 9. The toothed pin 26 is in its stowed position inserted into the rubber toothed pin holder 20. As shown in FIG. 5, pin holder 20 includes a slot extending substantially parallel to the elongate axis of combination lock 22, and the plurality of teeth of pin 26 are positioned in the slot in the stowed position. The rubber pin holder 20 affixed to the rear of the lock securely holds the two strands of the cable together during the stowing, removing, and storage within the handlebar of the lock. This aids in the insertion and extraction process and keeps the toothed pin 26 secure during storage so vibration and noise is not produced by its interaction with the interior of the handlebar. One of the plastic coated cables 28 is crimped into a crimping ferrule 21 cast into the lock body 9. The rubber toothed pin holder 20 is shown in cross section surrounding the end of the plastic coated cable 28, the crimping ferrule 21, and the stowed toothed pin 26. The other plastic coated cable 28a is crimped into the end of the toothed pin 26.

The two rings of resilient friction fingers 36 near the posterior of the lock assembly 9 share the same material and design features of the anterior ring. As shown in FIG. 5, fingers 36 project substantially perpendicular to the elongate axis of combination lock 22. The rear rings are stacked in close proximity to each other and have their sets of fingers in the same position rotationally in respect to the axis of the lock body. The two rings 36 are an integral part of the molded resilient toothed pin holder 20. Directly anterior to the rings and similarly part of the same resilient molded toothed pin holder 20 is a cylindrical flange 25 that is secured in a cylindrical groove in the posterior end of the lock body 9. It is this attachment that secures the entire toothed pin holder 20 to the lock body 9.

The insertion of the toothed pin 26 into the rubber bar end cap 24 for the locking position and use is advantageous as it maximizes the length and circular shape of the deployed cable versus previous designs that have both ends of the cable attached to and emerging from the same end of the lock assembly 8 in the locked configuration.

While the lock can be stored in any tube of suitable size, the invention contemplates an alternative embodiment that provides the means to provide friction to secure the lock body within the handlebar after insertion. FIG. 6 is a perspective view of a rubber cap end 118 and the exposed end of the handlebar 16 which the rubber end cap 118 is slid onto the outside surface during installation. The handlebar tape 14 is then wound around the plurality of tapered rubber end cap flaps 118a, securing the rubber end cap 118 to the end of the handlebar 16. The installed rubber end cap 118 with the securing handlebar tape 14 is shown also in cross section in FIG. 7. The internal diameter of the anterior end of the rubber end cap 118 is sized to grip the fixed diameter of the exterior surfaces of a plurality of the combination lock tumblers 34. This embodiment provides the needed friction to secure the lock assembly 8 within the handlebar 10 during storage.

The alternate embodiment for means to provide friction to secure the lock can be seen in FIG. 7 in a cross section view of the tape wrapped handle bar 10 end with the three tumbler combination lock 22 in its stowed position inserted in the rubber bar end cap 118. A metal lock end cap 124 with a toothed pin hole forms the anterior end of the lock body 9. Rubber bar end flaps 118a are seen lying on the outside of the handlebar 16 and secured by wraps of the handlebar tape 14. The resilient bar end cap 118 shown in cross section and in contact with combination lock tumblers 34. A rubber toothed pin holder 120 is attached to the rear of the metal lock body 9. In this embodiment the friction fingers 36 shown in FIG. 3 attached to the front and rear of the lock body 9 in the preferred embodiment are absent. The toothed pin 26 is in its stowed position inserted into the rubber toothed pin holder 120. One of the plastic coated cables 28 is crimped into a crimping ferrule 121 cast into the rear of the lock body 9. The rubber toothed pin holder 120 is shown in cross section surrounding the end of the plastic coated cable 28, the crimping ferrule 121, and the stowed toothed pin 26. The other plastic coated cable 28a is shown crimped into the end of the toothed pin 26.

Operation:

To Lock: The cable lock assembly 8 is taken from its stowed position by grasping the lock end cap 24 and pulling the lock assembly out of the taped handlebar 10. The correct three number combination is set on the three-tumbler combination lock 22. The toothed pin 26 is pulled out of the rubber toothed pin holder 20 and the cable is then wrapped around both a secure object and the desired bicycle component. The toothed pin 26 is then fully inserted into the toothed pin hole 32 with all three tumblers 34 set to the proper combination. The three tumblers 34 are then spun to random positions. The bicycle is thus locked.

To Unlock and Stow: The proper three number combination is set on the three tumbler combination lock 22 and the toothed pin 26 removed from the toothed pin hole 32. The toothed pin 26 is inserted into the rubber toothed pin holder 20 on the rear of the lock body 9. Starting with the plastic ball end 30, the lock assembly is inserted into the handlebar opening 18 until the entire lock body 9 and three-tumbler combination lock 22 is fully inserted into the handlebar opening 18 and only the lock end cap 24 is exposed. The lock is thus stowed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A lock assembly for a bicycle, comprising:
a shackle having first and second end portions, the first end portion including a locking member; and
a combination lock connected to the second end portion of the shackle, the combination lock including a plurality of rotating tumblers disposed along an elongate axis of the combination lock, the combination lock including a hole for receiving the locking member when the plurality of rotating tumblers are in an open position, the combination lock being configured to prevent removal of the locking member from the hole when the plurality of rotating tumblers are in a locked position, the plurality of rotating tumblers being disposed between a first set of resilient fingers and a second set of resilient fingers, the first and second sets of resilient fingers being configured to frictionally removably secure the combination lock to a bore of a handlebar of the bicycle.

2. The lock assembly of claim 1, wherein the lock assembly is operable between a stowed position and a removed position, the stowed position corresponding to the shackle and a rear end portion of the combination lock contained within the bore of the handlebar, the removed position corresponding to the lock assembly removed from the handlebar.

3. The lock assembly of claim 2, wherein operating the lock assembly from the stowed position toward the removed position causes the first and second sets of resilient fingers to flip away from an opening of the bore as the lock assembly is being extracted through the opening.

4. The lock assembly of claim 3, wherein the first and second sets of resilient fingers are bent over toward the opening of the bore in the stowed position.

5. The lock assembly of claim 1, wherein the shackle includes a cable.

6. The lock assembly of claim 1, wherein the plurality of tumblers are serially disposed along the elongate axis of the combination lock.

7. A lock assembly for a bicycle, comprising:
a shackle having first and second end portions, the first end portion including a locking member;
a combination lock connected to the second end portion of the shackle, the combination lock including a plurality of rotating tumblers serially disposed along an elongate axis of the combination lock, the combination lock including a hole for receiving the locking member when the plurality of rotating tumblers are in an open position, the combination lock being configured to prevent removal of the locking member from the hole when the plurality of rotating tumblers are in a locked position; and
a first set of resilient fingers coupled to the combination lock, the first set of resilient fingers being configured to frictionally removably secure the combination lock to a bore of a handlebar of the bicycle;
wherein the lock assembly is operable between a stowed position and a removed position, the stowed position corresponding to the shackle and a rear end portion of the combination lock being contained within the bore of the handlebar, the removed position corresponding to the lock assembly removed from the handlebar; and
further comprising a second set of resilient fingers coupled to the combination lock, the second set of resilient fingers being configured to frictionally removably secure the combination lock to the bore, the plurality of rotating tumblers being disposed between the first and second sets of resilient fingers.

8. A lock assembly removably stowable in a handlebar of a vehicle, comprising:
a shackle having a first end portion and a second end portion, the shackle extending between the first end portion and the second end portion, the first end portion including a locking member; and
a combination lock having an elongate axis extending from a rear end portion of the combination lock to a front end portion of the combination lock, the second end portion of the shackle being connected to the rear end portion of the combination lock, the front end portion of the combination lock including a hole configured to receive the locking member when the combination lock is in an open position, the combination lock being configured to prevent removal of the locking member from the hole when the combination lock is in a locked position;
wherein the lock assembly is operable between a stowed position and a removed position,
the stowed position corresponding to the locking member of the shackle removably coupled to the rear end portion of the combination lock, the shackle and the rear end portion of the combination lock contained within a bore of the handlebar, and the front end portion of the combination lock disposed in an opening to the bore, the removed position corresponding to the lock assembly completely removed from the bore, the locking member removed from the rear end portion of the combination lock, and the locking member inserted into the hole of the front end portion of the combination lock to form a loop in the lock assembly.

9. The lock assembly of claim 8, wherein the combination lock includes an end cap connected to the front end portion of the combination lock, the hole passing through the end cap, the end cap substantially sealing the opening to the bore in the stowed position.

10. The lock assembly of claim 9, wherein a first plurality of fingers project from the end cap, the first plurality of fingers being configured to frictionally removably secure the combination lock to an interior of the bore in the stowed position.

11. The lock assembly of claim 10, wherein the locking member is a pin having a plurality of teeth, the rear end portion of the combination lock includes a resilient pin holder configured to hold the pin in the stowed position.

12. The lock assembly of claim 11, wherein a second plurality of fingers project from the resilient pin holder, the second plurality of fingers being configured to frictionally removably secure the combination lock to the interior of the bore in the stowed position.

13. The lock assembly of claim 12, wherein a plurality of rotating tumblers are disposed between the first plurality of fingers and the second plurality of fingers, the plurality of tumblers being configured to operate the combination lock between the open and locked positions.

14. The lock assembly of claim 12, wherein the first and second pluralities of fingers project substantially perpendicular to the elongate axis of the combination lock.

15. The lock assembly of claim 12, wherein the first and second pluralities of fingers are arranged in respective first and second rings, each ring being substantially centered about the elongate axis of the combination lock.

16. The lock assembly of claim 12, wherein the end cap, the pin holder, and the first and second pluralities of fingers are made of rubber, and the vehicle is a bicycle.

* * * * *